United States Patent
Erkocak

(10) Patent No.: US 11,326,971 B2
(45) Date of Patent: May 10, 2022

(54) PRESSURE SENSOR DEVICE INCLUDING IMPROVED CONDUCTIVITY AND PROTECTION

(71) Applicant: MAKERSAN MAKINA OTOMOTIV SANAYI TICARET ANONIM SIRKETI, Kocaeli (TR)

(72) Inventor: Levent Erkocak, Kocaeli (TR)

(73) Assignee: MAKERSAN MAKINA OTOMOTIV SANAYI TICARET ANONIM SIRKETI, Kocaeli (TR)

( * ) Notice: Subject to any disclaimer, the term of this patent is extended or adjusted under 35 U.S.C. 154(b) by 37 days.

(21) Appl. No.: 16/969,887

(22) PCT Filed: Feb. 15, 2018

(86) PCT No.: PCT/TR2018/050059
§ 371 (c)(1),
(2) Date: Aug. 13, 2020

(87) PCT Pub. No.: WO2019/160514
PCT Pub. Date: Aug. 22, 2019

(65) Prior Publication Data
US 2021/0010890 A1   Jan. 14, 2021

(51) Int. Cl.
*G01L 19/00* (2006.01)
*G01L 19/06* (2006.01)
*G01L 19/14* (2006.01)

(52) U.S. Cl.
CPC ...... *G01L 19/0084* (2013.01); *G01L 19/0672* (2013.01); *G01L 19/144* (2013.01); *G01L 19/148* (2013.01)

(58) Field of Classification Search
None
See application file for complete search history.

(56) References Cited

U.S. PATENT DOCUMENTS

| | | | |
|---|---|---|---|
| 4,716,492 A * | 12/1987 | Charboneau | G01L 9/0075 361/283.4 |
| 7,900,520 B2 * | 3/2011 | Colombo | G01L 19/143 73/754 |
| 8,505,386 B2 * | 8/2013 | Colombo | G01L 19/0038 73/756 |
| 2004/0007073 A1 * | 1/2004 | Weise | G01L 19/0038 73/715 |
| 2016/0069765 A1 * | 3/2016 | Ishikawa | G01L 19/0654 73/431 |

FOREIGN PATENT DOCUMENTS

| | | |
|---|---|---|
| EP | 2136193 A2 | 12/2009 |
| JP | H11118646 A | 4/1999 |
| JP | H11166873 A | 6/1999 |
| WO | 2009153737 A1 | 12/2009 |

* cited by examiner

*Primary Examiner* — Lisa M Caputo
*Assistant Examiner* — Nigel H Plumb
(74) *Attorney, Agent, or Firm* — Bayramoglu Law Offices LLC

(57) ABSTRACT

A pressure sensing device comprising a body assembly, a connector assembly, an electronic circuit, and a pressure sensor is provided. The pressure sensing device is a compact device allowing for improved assembly. Moreover, the pressure sensing device allows for a leakage test and an electronic circuit control test to be performed before the assembly of the device thereby improving reliability and precision.

20 Claims, 5 Drawing Sheets

PRESSURE SENSOR DEVICE INCLUDING IMPROVED CONDUCTIVITY AND PROTECTION

CROSS-REFERENCE TO THE RELATED APPLICATIONS

This application is the national stage entry of International Application No. PCT/TR2018/050059, filed on Feb. 15, 2018, the entire contents of which are incorporated herein by reference.

TECHNICAL FIELD

The present invention relates to a pressure sensing device having a pressure sensor and more particularly to a pressure sensing device having a separate connector and body assembly, communicating with each other through a connecting member, e.g. a pogo pin.

BACKGROUND

Pressure sensing devices are used for electronically measuring and evaluating pressure. Such pressure sensing devices comprise pressure responsive sensors having a generally disc shaped configuration are well known. Pressure sensors used in such sensing device can be a sensor that provides a linear voltage output directly proportional to applied pressure.

In the prior art, it is known that connector assembly and the body assembly of the pressure sensor is attached to each other through standard cables. Said cables are mostly welded for attaching a ceramic sensor member. A prior art publication in the technical field of the present invention may be referred to as U.S. Pat. No. 4,716,492 among others, the document disclosing a capacitive pressure sensor having a thin ceramic diaphragm mounted in closely spaced, sealed, overlying relation to a ceramic base, and having metal coatings deposited on respective opposing surfaces of the diaphragm and base to serve as capacitor plates arranged in predetermined closely spaced relation to each other to form a capacitor.

One of the problems of such sensors is that a leakage test can only be carried out after the assembly of the pressure sensing device is done. Similarly, an electronic functional test can only be done after the assembly of the pressure sensing device. When the flexible connection cable is bent, there is a risk of deforming, furthermore a specialized ceramic sensor with metal tips has to be used for soldering or welding of that cable. Moreover, it is difficult to fix the electrical circuit to a main body of the pressure sensor and additional elements are required to connect printed circuit to apply an electrical test. The connection from the electronic card to the connector has a potential risk of, deforming, and damaging. Since a double spring connection is required, which results that an increase in the costs of the pressure device.

The pressure sensing device has to work perfectly, especially in areas where high requirements are placed on long-term stability, vibration resistance, electromagnetic compatibility, shock resistance or temperature insensitivity.

SUMMARY

Primary object of the present invention is to provide a compact, reliable and precise pressure sensing device wherein a number of components are eliminated.

Another object of the present invention is to provide a pressure sensing device in which a leakage test can be performed before the body assembly has been assembled. Similarly, another object of the present invention is to provide a pressure sensing device in which an electronic circuit control test can be done before the assembly of the pressure sensing device is done.

Another object of the present invention is to provide a pressure sensing device where a connector assembly and a main body of the pressure sensor can be produced and tested separately.

Another object of the present invention is to provide a pressure sensing device where a connector assembly and a main body of the pressure sensing device are produced as a rigid part by eliminating non-fixed extensions which allow a serially automated production. Yet another object is the provision of a pressure sensor not subject to the prior art limitations noted above. Yet another object of the invention is the provision of an improved method for assembling an electronic parts.

A pressure sensing device comprising: a body assembly having a main body with a sensor housing defined by an inner bottom wall and a side wall of the main body extending upwardly from the bottom wall into which a pressure sensor is disposed; the pressure sensor provided with a lower surface to be exposed to an applied pressure and having an upper contact portion disposed at an upper surface of the pressure sensor; a fluid inlet channel formed on the main body and a fluid pressure port formed in the sensor housing in communication with the fluid inlet channel and a connector assembly being on least partly placed into the body assembly having a connector body with an electrical circuit for providing an electrical output signal corresponding to the applied pressure; the electronic circuit having a connection member housing portion. The electronic circuit has at least two connection members attached to the connection member housing portion and the connector assembly is arranged to be aligned in the body assembly so that the at least two connection members of the electronic circuit are brought into a position to establish an electrical contact with the upper contact portion of the pressure sensor.

In a possible embodiment of the present invention, the pressure sensing device comprises a locking member has at least one positioning leg extending downwardly from a bottom wall of the locking member for positing the locking member in the sensor housing.

In a possible embodiment of the present invention, the pressure sensor is provided with at least one positioning groove extending from the lower surface to the upper surface and said at least one positioning groove is shaped and dimensioned with respect to the positioning leg of the locking member.

In a possible embodiment of the present invention, the locking member has an abutting surface extending outwardly and is arranged to be seated on a locking surface which is formed on the sensor housing and extends circumferentially therein.

In a possible embodiment of the present invention, the locking member further comprises a circular portion as an upper part of the abutting surface wherein the circular portion is, in use, arranged to be in contact with a limiting circular portion formed on the inner of the main body and is arranged to be brought under the limiting circular portion by pressing so that a predetermined pressure is applied via said locking member on the pressure sensor to keep in the sensor housing.

In a possible embodiment of the present invention, the locking member further comprises a positioning protrusion which is shaped and dimensioned with respect to a locking groove formed on an inner periphery of the sensor housing for positioning the locking member to be on the pressure sensor.

In a possible embodiment of the present invention, the locking member further comprises a locking groove which is shaped and dimensioned with respect to a positioning protrusion formed on an inner periphery of the sensor housing for positioning the locking member to be on the pressure sensor.

In a possible embodiment of the present invention, the connector assembly has at least one positioning protrusion formed on an outer periphery of the connector body, said at least one positioning protrusion shaped and dimensioned with respect to at least one connector positioning groove formed on an inner periphery of the main body such that the predetermined position of the connector assembly is arranged.

In a possible embodiment of the present invention, the connection member is a movable spring biased pogo-pin.

In a possible embodiment of the present invention, the connection member has a connection end soldered or welded directly to the connection member housing portion of the electrical circuit and has a spring biased contact end arranged to establish electrical connection with a corresponding terminal provided on the upper contact portion.

In a possible embodiment of the present invention, the connector body has an at least one position leg extending from an outer bottom surface of the connector body wherein said position leg is arranged to be inserted to a corresponding contact hole of the electronic circuit for welding or soldering process thereof.

In a possible embodiment of the present invention, the connector body has a sealing member housing formed as a circular protrusion in which a circular shaped sealing member is disposed.

In a possible embodiment of the present invention, the main body further comprises a circular shaped sealing housing into which a sealing member is disposed wherein the sealing member is arranged to be pressed by the lower surface of the pressure sensor when the locking member is placed to the sensor housing.

In a possible embodiment of the present invention, the body assembly and the connector assembly are configured to be as a separate parts wherein an electrical connection between the pressure sensor and the electrical circuit is only established by the connection members provided therebetween when the connector assembly (30) is placed into the body assembly.

BRIEF DESCRIPTION OF THE DRAWINGS

Accompanying drawings are given solely for the purpose of exemplifying a pressure sensing device, whose advantages over prior art were outlined above and will be explained in brief hereinafter.

The drawings are not meant to delimit the scope of protection as identified in the claims nor should they be referred to alone in an effort to interpret the scope identified in said claims without recourse to the technical disclosure in the description of the present invention.

DETAILED DESCRIPTION OF THE EMBODIMENTS

Figure 1:
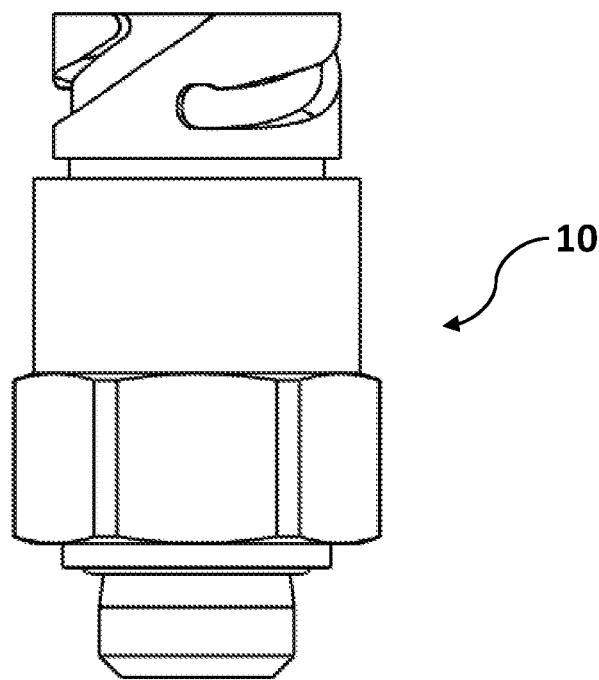
FIG. 1 demonstrates a perspective view of a pressure sensing device according to the present invention.

The invention will now be described in detail with reference to the accompanying drawings, wherein reference numerals assigned to the parts therein are listed as follows;

10. Pressure sensing device
20. Body assembly
   21. Locking member
      211. Positioning protrusion
      212. Lower surface
      213. Positioning leg
      214. Abutting surface
      215. Circular portion
   22. Pressure sensor
      221. Upper contact portion
      222. Positioning groove
      223. Signal conditioner
      224. Fluid housing
      225. Upper surface
   23. Sealing member
   24. Main body
      241. Connector positioning groove
      242. Limiting circular portion
      243. Outer sealing housing
      244. Sealing housing
      245. Fluid inlet channel
      246. Sensor housing
      247. Locking groove
      249. Locking surface
      250. Fluid pressure port
      251. Seating portion
   25. Inner bottom wall
   26. Port fitting portion
   27. Side wall
30. Connector assembly
   31. Connector body
      311. Positioning protrusion
      312. Sealing member housing
      313. Positioning leg
      314. Circular lip
      316 Connector terminal
   32. Sealing member 33. Electrical circuit
   331. Contact hole
   332. Connection member housing portion
34. Connection member
   341. Connection end
   342. Contact end The present invention relates to a pressure sensing device (10) comprising: a body assembly (20) having a main body (24) with a sensor housing (246) defined by an inner bottom wall (25) and a side wall (27) extending upwardly from the bottom wall (25) into which a pressure sensor (22) is disposed; the pressure sensor (22) provided with a lower surface (212) to be exposed to an applied pressure and having an upper contact portion (221) disposed at an upper surface (225) of the pressure sensor (22); a fluid inlet channel (245) formed on the main body (24) and a fluid pressure port (250) formed in the sensor housing (246) in communication with the fluid inlet channel (245) and a connector assembly (30) being at least partly placed into the body assembly (20) having a connector body (31) with a signal conditioning electrical circuit (33) for providing an electrical output signal corresponding to the applied pressure; the electronic circuit (33) having a connection member housing portion (332). The electronic circuit (33) has at least two connection members (34) attached to the connection member housing portion (332) and the connector assembly (30) is arranged to be aligned in the body assembly (20) so that the at least two connection members (34) of the electronic circuit (33) are brought into a position to establish an electrical contact with the upper contact portion (221) of the pressure sensor (22).

With reference to FIGS. 1-10, the pressure sensing device (10) made in accordance with a first embodiment of the invention will be described. The pressure sensing device (10) comprising a tubular port fitting portion (26) formed on the main body (24) wherein the port fitting portion (26) has a portion with a larger diameter, which is defined as a support flange with a flat surface and an outer sealing housing (243) into which a sealing member (23) can be firmly disposed. A fluid housing (224) in the form of a groove is formed on the pressure sensor (22) and is placed to be facing the fluid pressure port (250) when in use. Such pressure sensor (22) can have a ceramic sensor chip as the ceramic element. Further, the pressure sensor (22) can also be a ceramic pressure sensor having a resistance structure "printed" onto a base element (e.g. ceramic base) using thick-film technology, and burnt-in at high temperature. The resistance change of such ceramic pressure sensor can also be due to the deformation of the diaphragm, resulting from the geometrical change caused by the stretching and compression of the material thereof. The pressure sensor (22) can be provided with a signal conditioner (223) for providing an interface for piezoresistive and strain-gauge pressure-sense elements in the pressure sensor. The pressure sensor (22) can also include a base plate and a membrane, both of them made of Al2O3 Alumina. The first manufacturing step may consist in making a deposition of thick film conductors on the membrane, by screen printing. The pressure sensor (22) can be either piezo-resistive or ceramic pressure sensor.

Figure 2:
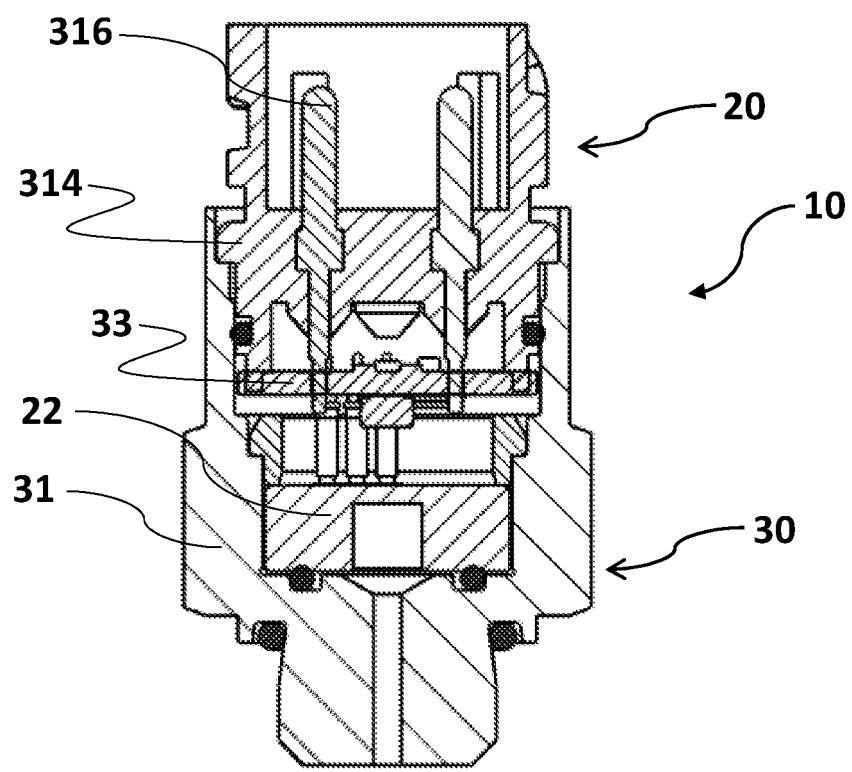
FIG. 2 is a cross sectional view of the pressure sensing device as shown in FIG. 1.

FIG. 1 demonstrates a perspective view of the pressure sensing device (10) and FIG. 2 is a cross sectional view of the pressure sensing device (10) according to a preferred embodiment of the present invention. The pressure sensor (22) of the pressure sensing device (10) according to the present invention has a lower surface (212) to be exposed to an applied pressure or the like and having the opposite upper surface (225) having transducer terminals disposed thereon.

The main body (24) formed of suitable material, such as aluminum, has the port fitting portion (26) with the fluid inlet channel (245), one end of the said fluid inlet channel (245) opened to the fluid pressure port (250) formed on the sensor housing (246).

The connector assembly (30) has a connector body (31) formed of electrically insulating material which is disposed to the body assembly (20) with the electrical circuit (33) having a plurality of connection numbers (34) for establishing electrical conductivity between the electrical circuit (33) and the pressure sensor (22). The connector assembly (30) has a plurality of connector terminals (316) extending at the inner volume of the connector body (31) for attachment to conditioning electronics.

Figure 3:
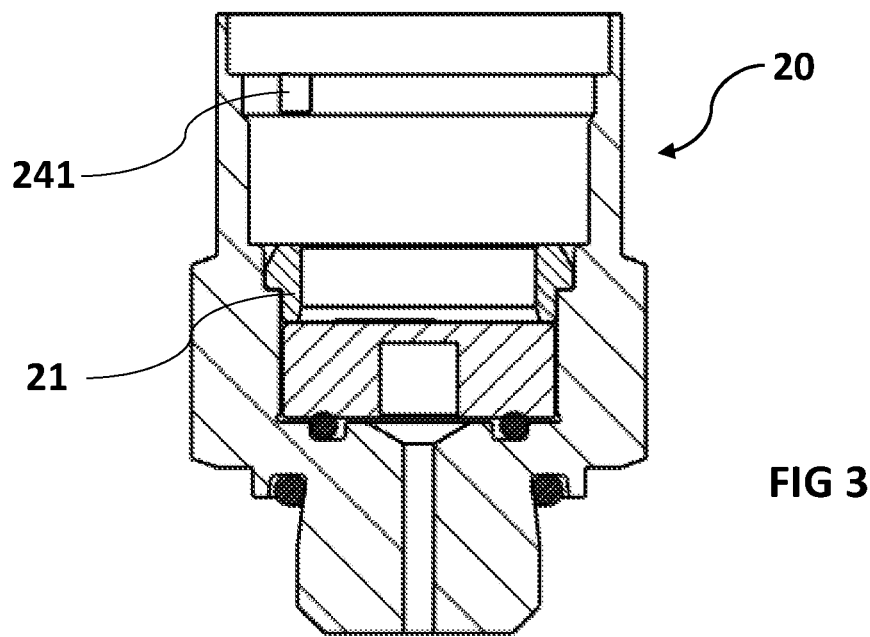
FIG. 3 is a cross sectional view of a main body of a pressure sensing device according to the present invention.
Figure 4:
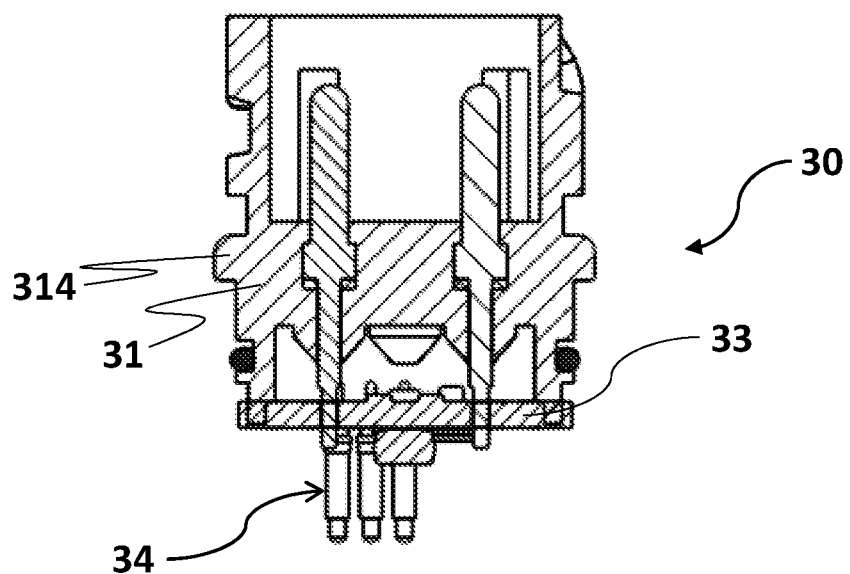
FIG. 4 is a cross sectional view of a connector assembly of a pressure sensing device according to the present invention.
Figure 5:
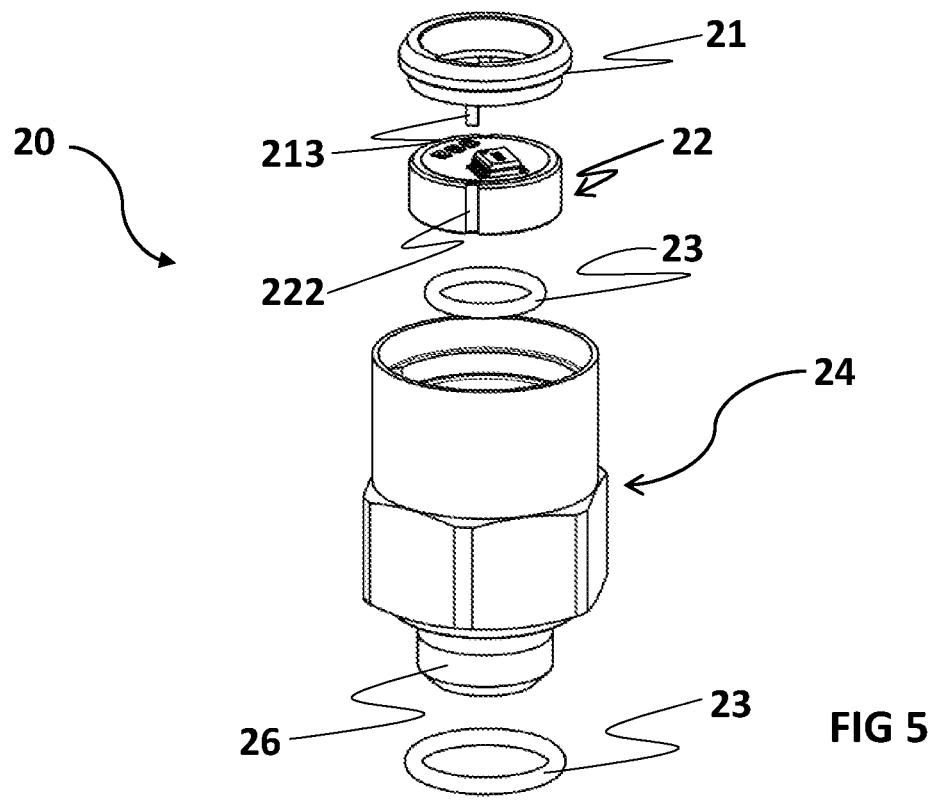
FIG. 5 is an exploded perspective view of a main body of a pressure sensing device according to the present invention.

Referring to the FIG. 3, a locking member (21) having at least one positioning leg (213) extending downwardly from a bottom wall of the locking member (21) for positing the locking member (21) in the sensor housing (246) is disposed to be on the pressure sensor (22). The locking member (21) preferably has a circular portion which can be stretched when attaching the locking member (21) into its position as shown in FIG. 3. The pressure sensor (22) can be provided with at least one positioning groove (222) extending from the lower surface (212) to the upper surface (225) wherein the at least one positioning groove (222) shaped and dimensioned with respect to the positioning leg (213) of the locking member (21) can be inserted into said positioning groove (222) for a stable fixation. Further, the locking member (21) can include an abutting surface (214) extending outwardly as a lip and is arranged to be seated on a stepped locking surface (249) formed on the sensor housing (246) extending circumferentially therein. Moreover, the locking member can include a circular portion (215) as an upper part of the abutting surface (214) wherein the circular portion (215) is, when in use, arranged to be in contact with a limiting circular portion (242) formed on the inner of the main body (24), as a stepped portion, and is arranged to be brought under the limiting circular portion (242) by pressing so that a predetermined pressure is applied via said locking member (21) on the pressure sensor (22) to keep in the sensor housing (246).

Figure 7A:
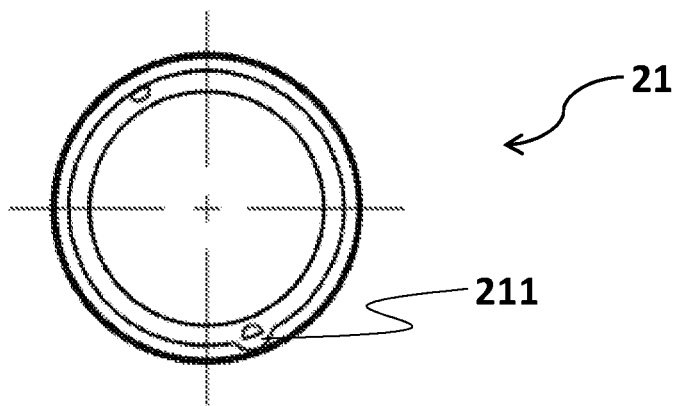
FIG. 7A is a top view of a locking member of a pressure sensing device according to the present invention.
Figure 7B:
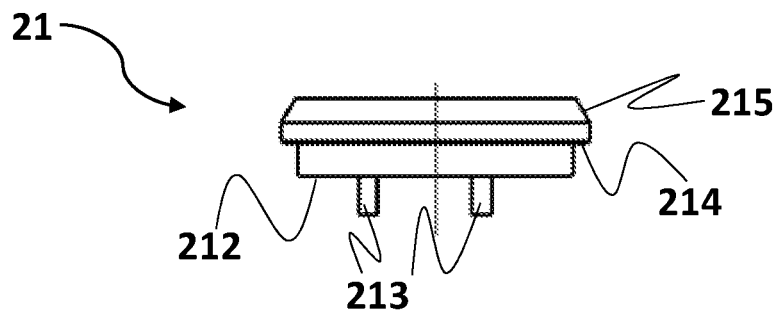
FIG. 7B is a front view of a locking member of a pressure sensing device according to the present invention.
Figure 8A:
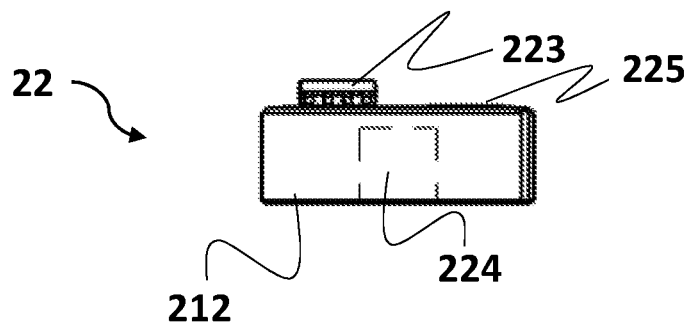
FIG. 8A is a front view of a pressure sensor of a pressure sensing device according to the present invention.
Figure 8B:
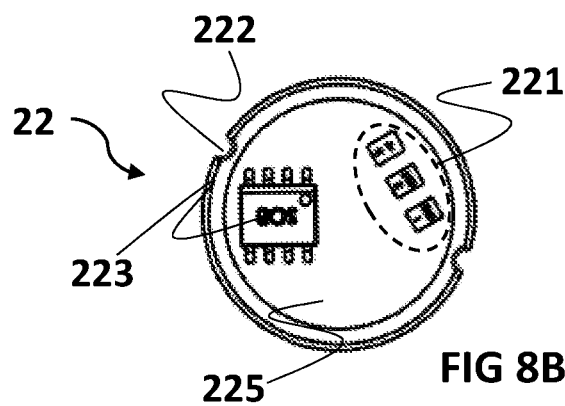
FIG. 8B is a top view of a pressure sensor of a pressure sensing device according to the present invention.
Figure 9:
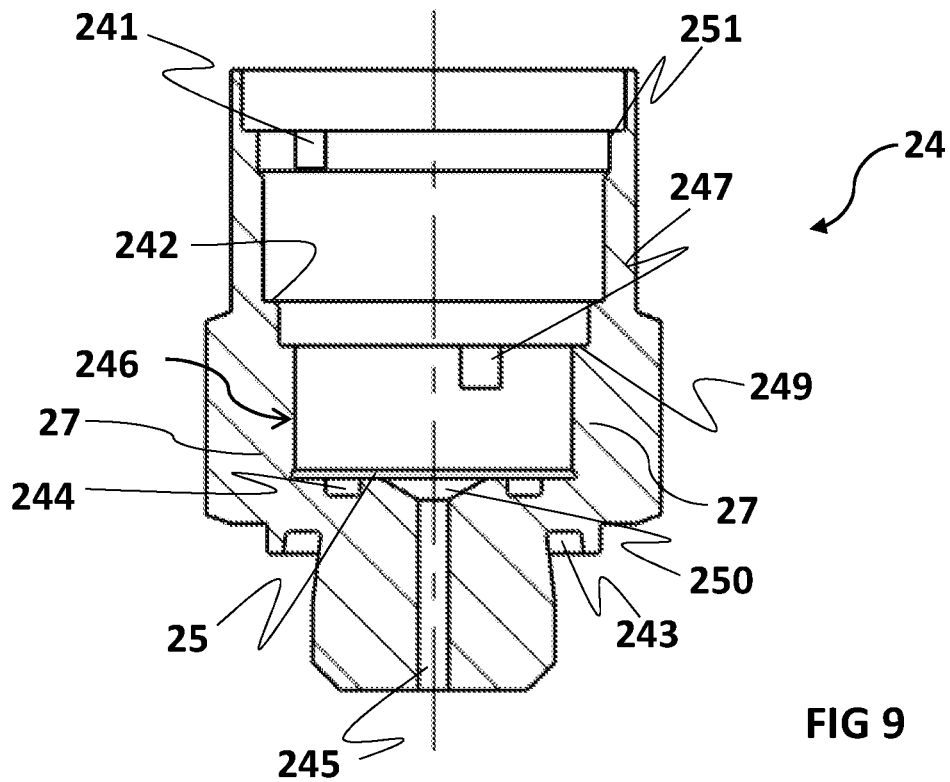
FIG. 9 is a cross sectional view of a main body of a pressure sensing device where a pressure sensor is not placed, according to the present invention.

Referring to FIG. 7A and FIG. 9, the locking member (21) further can include a positioning protrusion (211) which is shaped and dimensioned with respect to a locking groove (247) formed on an inner periphery of the sensor housing (246) for positioning the locking member (21) to be on the pressure sensor (22). Similarly, the locking member (21) can include a locking groove which is shaped and dimensioned with respect to a positioning protrusion formed on an inner periphery of the sensor housing (246) for positioning the locking member (21) to be on the pressure sensor (22). With such arrangements, said locking member (21) helps to increase the impermeability of the body assembly (20) by surrounding and firmly keeping the pressure sensor (22) in the sensor housing (246). The positioning protrusion (211) is preferably formed on the locking (21) and has a cross-section in the form of square or rectangular.

Figure 10:
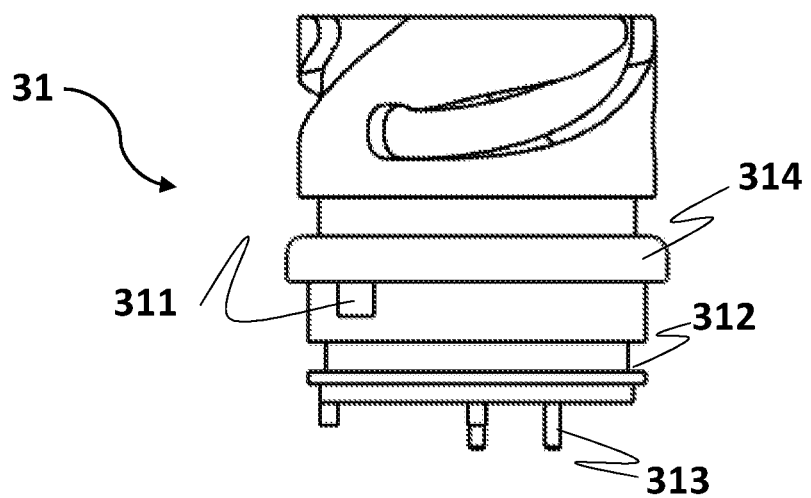
FIG. 10 is a perspective view of a connector assembly of a pressure sensing device.

Referring to the FIG. 10, the connector assembly (30) can include at least one positioning protrusion (311) formed on an outer periphery of the connector body (31) wherein said at least one positioning protrusion (311) is shaped and dimensioned with respect to at least one connector positioning groove (241) formed on an inner periphery of the main body (24) such that the predetermined position of the connector assembly (30) can be arranged. According to the present invention, the body assembly (20) and the connector assembly (30) of the pressing sensing device (10) are configured to be as a separate parts wherein an electrical connection between the pressure sensor (22) and the electrical circuit (33) is only established by the connection members (34) provided therebetween when the connector assembly (30) is placed into the body assembly (20) for the installation of the pressure sensing device (10). With such arrangements, a various control test for the body assembly (20) and the connector assembly (30) can applied separately by eliminating need of assembly of said two parts. For example, a leakage test can be performed only after the body assembly (20) has been assembled. Similarly, the leakage test can be performed only after the connector assembly (30) has been assembled. The main body (24) of the pressure sensing device (10) is provided with a circular shaped seating portion (251) at the inner periphery of the main body (24). Referring to the FIG. 10, the connector body (31) is provided with a circular lip (314) extending outwardly form the outer periphery of the connector body (31) and is shaped and dimensioned with respect to the seating portion (251) of the main body (24). Referring to the FIG. 2, when the body assembly (20) is attached to the connector assembly (30), the circular lip (314) is seated on the seating portion (251) of the main body (24) such that leak tightness of the pressure sensing device (10) is improved.

Figure 6:
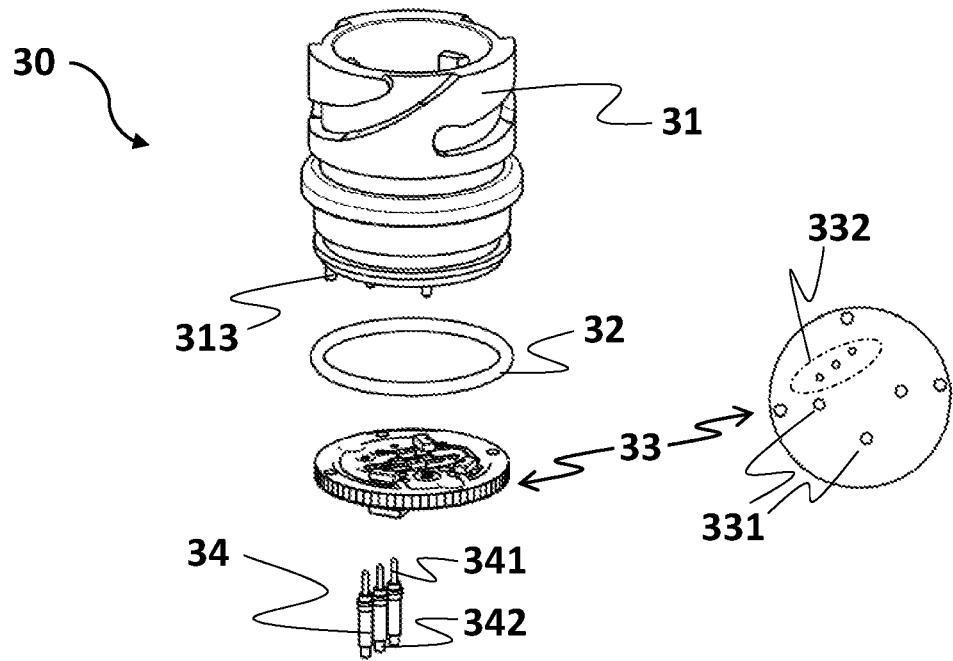
FIG. 6 is an exploded perspective view of a connector assembly of a pressure sensing device according to the present invention.

Referring to the FIG. 6, in a preferred embodiment the connection member (34) has a number of three, preferably at least two. The number of connection member (34) can vary. The connection member (34) preferably has a connection end (341) soldered or welded directly to the connection member housing portion (332) of the electrical circuit (33) and has a spring biased contact end (342) arranged to establish electrical connection with a corresponding terminal provided on the upper contact portion (221) of the pressure sensor (22).

The connection member (34) can be a movable spring loaded pogo-pin which is typically made of three machined components and assembled with an internal spring to provide the range of movement required. All of the three components of the pogo-pin can be electro plated to ensure excellent electrical conductivity, durability and corrosion protection throughout the life of the product. Said connection member (34) can include a plunger (or head), barrel (or body), and a fully encapsulated fine spring, to provide the spring force required to maintain positive contact. As shown in FIG. 2, when the connector assembly (30) is attached to the body assembly (20), the connection member (34) of the electronic circuit (33) come to a position in which an electrical contact between the upper contact portion (221) of the pressure sensor (22) and the electrical circuit (33) is established.

Again referring to the FIG. 6, the connector body (31) has an at least one position leg (313) extending from an outer bottom surface of the connector body (31) wherein said positioning leg (313) can be arranged to be inserted into a corresponding contact hole (331) of the electronic circuit (33) for welding or soldering process thereof. When the electronic circuit (33) is aligned with the position leg (313), the position of the connection member housing portion (332) is also arranged in which said connection members (34) are attached to be in contact with the terminals of the pressure sensor (22). The connection member housing portion (332) can have three terminals, each of said terminals arranged to be in electrical contact with connection member (34).

Referring to the FIG. 10, the connector body (31) can include a sealing member housing (312) formed as a circular protrusion in which a circular shaped sealing member (32) can be disposed which helps to increase the impermeability of the pressure sensing device (10). Furthermore, the main body (24) further comprises a sealing housing (244), preferably circular shaped, into which a sealing member (23) can be disposed wherein the sealing member (23) is pressed by the lower surface (212) of the pressure sensor (22) when the locking member (21) is placed to the sensor housing (246).

What is claimed is:

1. A pressure sensing device comprising:
    a body assembly having a main body with a sensor housing, wherein the sensor housing is defined by an inner bottom wall and a side wall extending upwardly from the inner bottom wall; a pressure sensor is disposed into the inner bottom wall; the pressure sensor provided with a lower surface to be exposed to an applied pressure and having an upper contact portion being on an upper surface of the pressure sensor;
    a fluid inlet channel formed on the main body and a fluid pressure port formed in the sensor housing in communication with the fluid inlet channel; and
    a connector assembly, wherein the connector assembly is at least partly placed into the body assembly having a connector body with an electrical circuit for providing an electrical output signal corresponding to the applied pressure; the electrical circuit has a connection member housing portion and at least two connection members attached to the connection member housing portion; the connector assembly is arranged to be aligned in the body assembly and the at least two connection members of the electrical circuit are brought into a position to establish an electrical contact with the upper contact portion of the pressure sensor.

2. The pressure sensing device according to claim 1, wherein a locking member having at least one positioning leg extending downwardly from a bottom wall of the locking member for positing the locking member in the sensor housing.

3. The pressure sensing device according to claim 2, wherein the pressure sensor is provided with at least one positioning groove extending from the lower surface to the upper surface and the at least one positioning groove is shaped and dimensioned with respect to the at least one positioning leg of the locking member.

4. The pressure sensing device according to claim 3, wherein the locking member has an abutting surface extending outwardly and is arranged to be seated on a locking surface, wherein the locking surface is formed on the sensor housing and extends circumferentially in the sensor housing.

5. The pressure sensing device according to claim 3, wherein the locking member further comprises a locking groove, wherein the locking groove is shaped and dimensioned with respect to a positioning protrusion formed on an inner periphery of the sensor housing for positioning the locking member to be on the pressure sensor.

6. The pressure sensing device according to claim 2, wherein the locking member has an abutting surface extending outwardly and is arranged to be seated on a locking surface, wherein the locking surface is formed on the sensor housing and extends circumferentially in the sensor housing.

7. The pressure sensing device according to claim 6, wherein the locking member further comprises a circular portion as an upper part of the abutting surface, wherein the circular portion is, in use, arranged to be in contact with a limiting circular portion formed on an inner of the main body and is arranged to be brought under the limiting circular portion by pressing and a predetermined pressure is applied via the locking member on the pressure sensor to keep in the sensor housing.

8. The pressure sensing device according to claim 7, wherein the locking member further comprises a locking groove, wherein the locking groove is shaped and dimensioned with respect to a positioning protrusion formed on an inner periphery of the sensor housing for positioning the locking member to be on the pressure sensor.

9. The pressure sensing device according to claim 6, wherein the locking member further comprises a locking groove, wherein the locking groove is shaped and dimensioned with respect to a positioning protrusion formed on an inner periphery of the sensor housing for positioning the locking member to be on the pressure sensor.

10. The pressure sensing device according to claim 2, wherein the locking member further comprises a positioning protrusion, wherein the positioning protrusion is shaped and dimensioned with respect to a locking groove formed on an inner periphery of the sensor housing for positioning the locking member to be on the pressure sensor.

11. The pressure sensing device according to claim 2, wherein the main body further comprises a circular shaped sealing housing; a sealing member is disposed into the circular shaped sealing housing, and the sealing member is arranged to be pressed by the lower surface of the pressure sensor when the locking member is placed to the sensor housing.

12. The pressure sensing device according to claim 2, wherein the locking member further comprises a locking groove, wherein the locking groove is shaped and dimensioned with respect to a positioning protrusion formed on an inner periphery of the sensor housing for positioning the locking member to be on the pressure sensor.

13. The pressure sensing device according to claim 1, wherein a locking member comprises a locking groove, wherein the locking groove is shaped and dimensioned with respect to a positioning protrusion formed on an inner periphery of the sensor housing for positioning the locking member to be on the pressure sensor.

14. The pressure sensing device according to claim 1, wherein the connector assembly has at least one positioning protrusion formed on an outer periphery of the connector body, the at least one positioning protrusion shaped and dimensioned with respect to at least one connector positioning groove formed on an inner periphery of the main body and arranged to engage with the at least one connector positioning groove by determining a predetermined position of the connector assembly.

15. The pressure sensing device according to claim 1, wherein a connection member of the at least two connection members is a movable spring biased pogo-pin.

16. The pressure sensing device according to claim 15, wherein the connection member of the at least two connection members has a connection end soldered or welded directly to the connection member housing portion of the electrical circuit and has a spring biased contact end arranged to establish an electrical connection with a corresponding terminal provided on the upper contact portion.

17. The pressure sensing device according to claim 1, wherein the connector body has an at least one position leg extending from an outer bottom surface of the connector body wherein the at least one position leg is arranged to be inserted to a corresponding contact hole of the electrical circuit.

18. The pressure sensing device according to claim 1, wherein the connector body has a sealing member housing formed as a circular protrusion, and a circular shaped sealing member is disposed in the circular protrusion.

19. The pressure sensing device according to claim 1, wherein the body assembly and the connector assembly are configured to be as a separate part; an electrical connection between the pressure sensor and the electrical circuit is only established by the at least two connection members provided between the pressure sensor and the electrical circuit when the connector assembly is placed into the body assembly for an installation of the pressure sensing device.

20. The pressure sensing device according to claim 1, wherein the pressure sensor is a ceramic pressure sensor.

\* \* \* \* \*